No. 741,937. PATENTED OCT. 20, 1903.
R. SCHMIDT.
LIQUID FLY CATCHER.
APPLICATION FILED APR. 19, 1902.
NO MODEL.
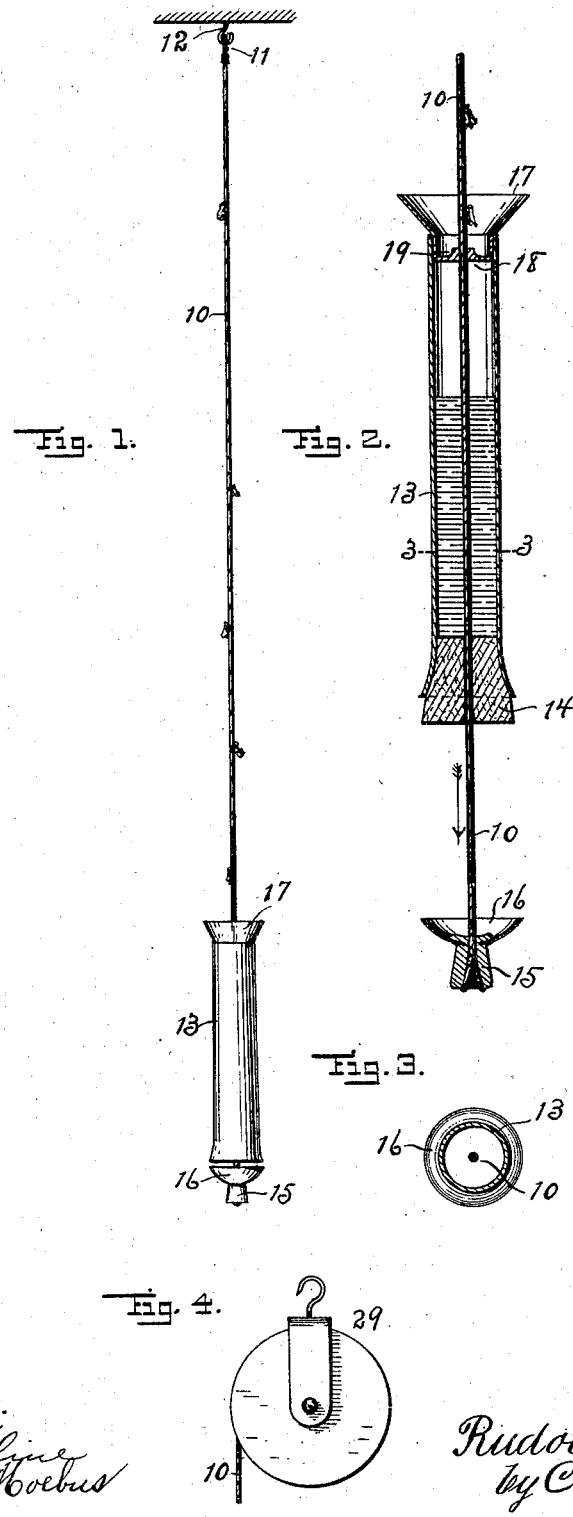
Witnesses.
Arthur J. Kline
Albert A. Moebus
Inventor.
Rudolph Schmidt
by C. Spengel atty No. 741,937. Patented October 20, 1903.

UNITED STATES PATENT OFFICE.

RUDOLPH SCHMIDT, OF CINCINNATI, OHIO, ASSIGNOR OF ONE-HALF TO TIMOTHY REARDON, OF CINCINNATI, OHIO.

LIQUID FLY-CATCHER.

SPECIFICATION forming part of Letters Patent No. 741,937, dated October 20, 1903.

Application filed April 19, 1902. Serial No. 103,712. (No model.)

*To all whom it may concern:*

Be it known that I, RUDOLPH SCHMIDT, a citizen of the United States, residing in the city of Cincinnati, in the county of Hamilton and State of Ohio, have invented a certain new and useful Liquid Fly-Catcher; and I do declare the following to be a clear, full, and exact description thereof, attention being called to the accompanying drawings, with the reference-numerals marked thereon, which form also a part of this specification.

This invention relates to insect-destroyers, and is more particularly intended for catching flies. The operation is carried out by the use of a viscid and sticky substance, whereby the insects are first attracted and then held after alighted.

The invention consists of the means all as shown and described and used for carrying the sticky substance, of the means for applying this latter to the former, and of the means whereby the device is maintained in operative condition.

In the following specification, and particularly pointed out in the claims following, is found a full description of the invention, together with its manner of use, parts, and construction, which latter is also illustrated in the accompanying drawings, in which—

Figure 1 shows the device in its preferred form and as it appears when in active use. Fig. 2 is a vertical section thereof, showing it on an enlarged scale. Fig. 3 is a horizontal section on line 3 3 of the preceding figure. Fig. 4 shows a modification, the construction and operation of which will be described at the proper time.

The adhesive or sticky mass used may be of any suitable viscid composition and analogous to the coating used for fly-paper. Its prime requisites are capacity to remain moist for a long time, being attractive to insects by odor or taste, and having such consistency and adhesiveness as to cause it not only to adhere without running to the means used as its carrier, but also to hold the insects after they have come in contact with it. As a carrier for this substance I use a strip of ribbon, fabric, or cord of not too hard or close a texture, so as to readily absorb and hold the coating of the sticky substance. This strip by preference is in shape of a cord 10 and is provided with a loop, hook, or ring 11 at one end to permit of its suspension from a complementary member 12, provided in a suitable position, as at the ceiling or in a window-opening. The substance for coating the cord and for renewing the same is contained in a receptacle 13 and is applied by passing the cord through this receptacle. The cord and its supply vessel are arranged together, and in this manner that part of the cord is also within the vessel at all times, while the remainder may be passed through the same and through the substance therein, so as to receive a new coating. This manipulation of the cord for recoating it is at the same time utilized to remove the old coat, with the insects adhering thereto.

In Figs. 1, 2, and 3 the receptacle 13 is in form of a tube permanently closed at one end and provided with a removable stopper 14 at the other end, which permits introduction of the substance for the coating. There are small openings in opposite ends of the receptacle of small size to fit the cord and to merely permit the same to pass through. One end of this cord has the loop or hook before mentioned and the other a pull-knob 15. The device is used, as shown in Fig. 1, with the receptacle at the lower end. Stopper 14, which is preferably of cork, is supposed to surround cord 10 with sufficient closeness to prevent the viscid mass from oozing out thereat. To prepare, however, for such contingency, there is a drip-cup 16 above knob 15, which receives any matter which may possibly so escape. In practice I make these two parts in one, the knob being of soft metal, like lead. Its upper end is passed through this cup and riveted thereto by being spread inside of the latter. The end of the cord is passed through a hole in this knob. The upper end is closed by a cap 17, which by preference is not removable and may be held in place by solder or otherwise. Its bottom 18 is below the upper end of the tube, so as to form thereat also a drip-cup to receive any possible drain from the cord. To better suit the cap for such purpose, it is outwardly enlarged beyond the upper edge of vessel 13, as shown. The principal function of this cap 17 is, however, as a stripper to remove the old coating, with the flies adhering thereto, and to serve as a cup to temporarily receive the scrapings. This manipulation consists of disengaging the cord from its point of suspension and by taking hold of knob 15 pulling the same through the opening in the stripper in a direction as shown by the arrow in Fig. 2. The edge around this opening is preferably turned up, as shown, forming a scraper edge 19. The same effect might be obtained by taking hold of knob 15 first and passing the vessel up on the cord. Either manipulation causes the old coating, with the flies, to accumulate in the stripper-cup, from where they may be readily removed. The parts are now restored to their position as shown in Fig. 1, which necessitates, as is readily apparent, a passage of the cord through the coating substance, thus restoring the device again to proper condition.

In Fig. 4 the cord 10, coated by any of the described means or by any other, is simply wound upon a reel 29, from which it is pulled off as required. The free length after becoming unfit for further use is cut off and more cord reeled off.

Having described my invention, I claim as new—

In a device for the purpose described, the combination of a receptacle adapted to contain a viscid substance, a removable stopper at its lower end, a combined stripper and drip-cup at its upper end, perforations in both, a cord fitted to these perforations and a part of it occupying also the receptacle between these perforations, it being also free to be drawn through them, a drip-cup at the lower end of this cord, a pull-knob thereat and means for attaching the upper end of the cord for suspending the entire device.

RUDOLPH SCHMIDT.

Witnesses:
C. SPENGEL,
ARTHUR KLINE.